US012764159B2

(12) United States Patent
Siev et al.

(10) Patent No.: US 12,764,159 B2
(45) **Date of Patent: *Oct. 13, 2026**

(54) MONITORING OF JAVASCRIPT OBJECT PROPERTIES FOR DETECTION OF WEB BROWSER SECURITY THREATS

(71) Applicant: FIVE MEDIA MARKETING LIMITED, Nicosia (CY)

(72) Inventors: Amnon Sem Siev, Hod Hasharon (IL); Daniel Maman, Kiryat Tiv'on (IL); Nili Davidor, Petah Tikva (IL)

(73) Assignee: FIVE MEDIA MARKETING LIMITED, Nicosia (CY)

( * ) Notice: Subject to any disclaimer, the term of this patent is extended or adjusted under 35 U.S.C. 154(b) by 102 days.

This patent is subject to a terminal disclaimer.

(21) Appl. No.: 18/586,519

(22) Filed: Feb. 25, 2024

(65) Prior Publication Data

US 2024/0259426 A1 Aug. 1, 2024

Related U.S. Application Data

(63) Continuation of application No. 17/334,754, filed on May 30, 2021, now Pat. No. 11,949,712, which is a (Continued)

(51) Int. Cl.
*H04L 9/40* (2022.01)

(52) U.S. Cl.
CPC ...... *H04L 63/1483* (2013.01); *H04L 63/1416* (2013.01); *H04L 63/1425* (2013.01); *H04L 63/1433* (2013.01)

(58) Field of Classification Search
CPC ............. H04L 63/1483; H04L 63/1416; H04L 63/1425; H04L 63/1433; H04L 63/145;
(Continued)

(56) References Cited

U.S. PATENT DOCUMENTS 6,438,592 B1 8/2002 Killian
9,979,726 B2 5/2018 Freitas Fortuna dos Santos et al.
(Continued)

FOREIGN PATENT DOCUMENTS

CN 102930203 A * 2/2013
CN 107301345 A * 10/2017 ......... H04L 63/1466
(Continued)

OTHER PUBLICATIONS

Digital.ai Software, Inc., "Application Protection for Web," Online at https://digital.ai/application-protection/web-app-protection, Feb. 22, 2021.

(Continued)

*Primary Examiner* — Sarah Su
(74) *Attorney, Agent, or Firm* — The Roy Gross Law Firm, LLC; Roy D. Gross

(57) ABSTRACT

Detection of a security threat to a web browser by: Wrapping a suspect JavaScript code with a detection JavaScript code, wherein, when the wrapped suspect JavaScript code is executed in a web browser, the detection JavaScript code indirectly monitors access to a property of a non-writable, non-configurable JavaScript property, to detect an attempt by the suspect JavaScript code to perform a malicious action in the web browser. Executing the wrapped suspect JavaScript code in the web browser, to effect the monitoring and the detection.

33 Claims, 3 Drawing Sheets

Related U.S. Application Data continuation of application No. 17/182,711, filed on Feb. 23, 2021, now Pat. No. 11,025,671.

(58) Field of Classification Search
CPC ......... H04L 63/1466; G06F 2221/2111; G06F 2221/2119; G06F 21/561
See application file for complete search history.

(56) References Cited

U.S. PATENT DOCUMENTS

| | | | |
|---|---|---|---|
| 10,095,846 | B2 | 10/2018 | Freitas Fortuna dos Santos et al. |
| 10,102,384 | B2 | 10/2018 | Freitas Fortuna dos Santos |
| 10,205,749 | B1 * | 2/2019 | Sem Siev ........... H04L 63/1466 |
| 10,404,662 | B1 | 9/2019 | Ben-Dor et al. |
| 10,467,408 | B1 | 11/2019 | Siev et al. |
| 10,554,677 | B1 | 2/2020 | Mehta et al. |
| 10,554,682 | B2 | 2/2020 | Greenshpan et al. |
| 10,560,539 | B1 | 2/2020 | Loch et al. |
| 10,599,834 | B1 | 3/2020 | Stoletny |
| 10,642,980 | B1 | 5/2020 | Demsey et al. |
| 10,708,287 | B2 | 7/2020 | Safruti et al. |
| 11,025,669 | B2 * | 6/2021 | Sem Siev ........... H04L 63/1466 |
| 11,025,671 | B1 * | 6/2021 | Siev .................... H04L 63/1466 |
| 11,949,712 | B2 * | 4/2024 | Siev .................... H04L 63/1416 |
| 2003/0097591 | A1 | 5/2003 | Pham et al. |
| 2011/0030060 | A1 | 2/2011 | Kejriwal |
| 2011/0247072 | A1 | 10/2011 | Staniford et al. |
| 2011/0289582 | A1 | 11/2011 | Kejriwal et al. |
| 2014/0304766 | A1 | 10/2014 | Livne |
| 2015/0178057 | A1 | 6/2015 | Miadowicz et al. |
| 2015/0256556 | A1 * | 9/2015 | Kaminsky ............. H04L 63/168 726/23 |
| 2016/0321038 | A1 | 11/2016 | Ge |
| 2017/0109243 | A1 | 4/2017 | Kumar |
| 2018/0012144 | A1 | 1/2018 | Ding et al. |
| 2018/0198807 | A1 | 7/2018 | Johns et al. |
| 2019/0087574 | A1 | 3/2019 | Schmidtler et al. |
| 2019/0318098 | A1 * | 10/2019 | Clift .................... G06F 11/3604 |
| 2020/0053109 | A1 | 2/2020 | Lancioni et al. |
| 2020/0097653 | A1 | 3/2020 | Mehta et al. |
| 2020/0356661 | A1 | 11/2020 | Stoletny et al. |
| 2020/0358818 | A1 * | 11/2020 | Stoletny ................ G06F 21/566 |
| 2021/0075817 | A1 | 3/2021 | Stokes |
| 2022/0030018 | A1 * | 1/2022 | Jeyakumar ............ H04L 63/123 |
| 2022/0116411 | A1 | 4/2022 | Melicher et al. |
| 2022/0131877 | A1 | 4/2022 | Oest et al. |
| 2023/0214235 | A1 * | 7/2023 | Kisliakov ........... G06F 9/44526 719/320 |
| 2024/0259426 | A1 * | 8/2024 | Siev .................... H04L 63/1466 |

FOREIGN PATENT DOCUMENTS

| | | | | | |
|---|---|---|---|---|---|
| CN | 108900496 | A | * | 11/2018 | ......... H04L 63/1416 |
| CN | 116915618 | A | * | 10/2023 | ............. H04L 41/12 |
| EP | 2642715 | A1 | | 9/2013 | |
| KR | 101577404 | B1 | * | 12/2015 | ......... H04L 63/1466 |
| KR | 20250178102 | A | * | 12/2025 | ............. G06F 9/547 |
| WO | 2018131199 | A1 | | 7/2018 | |
| WO | 2020124010 | A1 | | 6/2020 | |

OTHER PUBLICATIONS

Rapidspike, "Magecart Detection Monitor," Online at https://www.rapidspike.com/security-magecart-detection, Feb. 22, 2021.
Jscrambler, "Webpage Integrity," Online at https://jscrambler.com/webpage-integrity, Feb. 22, 2021.
Namogoo, "Customer Journey Hijacking Prevention," Online at https://www.namogoo.com/customer-hijacking-prevention, Feb. 22, 2021.
Ensighten, "Client-Side Website Attacks," Online at https://www.ensighten.com/client-side-website-attacks, Feb. 22, 2021.
Feroot, "Feroot Inspector—Gain attacker's view of weakness within the front end of your web application," Online at https://www.feroot.com/inspector, Feb. 22, 2021.
Feroot, "Complete Protection Against Continually Evolving Client-Side [UX] Threats," Online at https://www.feroot.com/page-guard, Feb. 22, 2021.
Feroot, "User-first Security Monitoring," Online at https://www.feroot. com, Feb. 22, 2021.
PerimeterX, "PerimeterX Page Defender—Keep your shoppers on the path to purchase," Online at https://www.perimeterx.com/products/page-defender, Feb. 22, 2021.
Akamai, "Page Integrity Manager," Online at https://www.akamai.com/uk/en/products/security/page-integrity-manager.jsp, Feb. 22, 2021.

* cited by examiner

MONITORING OF JAVASCRIPT OBJECT PROPERTIES FOR DETECTION OF WEB BROWSER SECURITY THREATS

CROSS-REFERENCE TO RELATED APPLICATIONS

This application is a continuation of U.S. patent application Ser. No. 17/334,754 filed May 30, 2021, which is a continuation of U.S. patent application Ser. No. 17/182,711 filed Feb. 23, 2021 (issued as U.S. Pat. No. 11,025,671 on May 12, 2021). The content of both applications is hereby incorporated by referenced in its entirety.

BACKGROUND

The invention relates to the field of computer security.

Various types of security attacks utilize third-party scripts executed by web browsers as their attack vector. Web site owners may innocently allow such scripts to be included in their web site (or be called from their web site's code), not knowing of their intended purpose to attack web browsers of the web site's visitors. Such scripts may be contain sophisticated JavaScript programming that causes a visitor's web browser to redirect to or to access the attacker's desired resource without any intentional action by the visitor and without the visitor's consent. This is true both for regular, popular web browsers, such as Chrome™, Firefox™, Safari®, or Edge™, as well as for web browser engines ("web views") embedded in software applications for desktop computers and portable computing devices, where they are used to fetch external content, such as advertisements potentially containing third-party scripts, displayed next to the regular content of the application.

Attacks which utilize third-party scripts are indeed often included with online advertisements that are displayed by web browsers. These advertisements may include seemingly-innocent graphics effected by HTML (HyperText Markup Language) programming that is served to the web browser in conjunction with the third-party script.

While some of these attacks are simply intended to draw Internet traffic to the attacker's monetized web page, others may pose more significant security risks by silently installing or loading unwanted software or even viruses, or by extracting personal information from the portable computing device, to name a couple of examples.

As industry introduces new tools to circumvent such attacks, attackers adapt quickly and introduce more sophisticated attacks, typically by employing more intricate JavaScript programming that manages to evade detection.

The foregoing examples of related art and limitations related thereto are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a computer-implemented method comprising: wrapping a suspect JavaScript code with a detection JavaScript code, wherein, when the wrapped suspect JavaScript code is executed in a web browser, the detection JavaScript code indirectly monitors access to a property of a non-writable, non-configurable JavaScript property, to detect an attempt by the suspect JavaScript code to perform a malicious action in the web browser; and executing the wrapped suspect JavaScript code in the web browser, to effect the monitoring and the detection.

Another embodiment provides a system comprising at least one hardware processor, and a non-transitory computer-readable storage medium having program code embodied therewith, the program code executable by said at least one hardware processor to, automatically: wrap a suspect JavaScript code with a detection JavaScript code, wherein, when the wrapped suspect JavaScript code is executed in a web browser, the detection JavaScript code indirectly monitors access to a property of a non-writable, non-configurable JavaScript property, to detect an attempt by the suspect JavaScript code to perform a malicious action in the web browser; and execute the wrapped suspect JavaScript code in the web browser, to effect the monitoring and the detection.

A further embodiment provides a computer program product comprising a non-transitory computer-readable storage medium having program code embodied therewith, the program code executable by at least one hardware processor to, automatically: wrap a suspect JavaScript code with a detection JavaScript code, wherein, when the wrapped suspect JavaScript code is executed in a web browser, the detection JavaScript code indirectly monitors access to a property of a non-writable, non-configurable JavaScript property, to detect an attempt by the suspect JavaScript code to perform a malicious action in the web browser; and execute the wrapped suspect JavaScript code in the web browser, to effect the monitoring and the detection.

In some embodiments, the monitoring comprises changing a scope of the suspect JavaScript code, to make the access to the property indirectly monitorable.

In some embodiments, the changing of the scope comprises executing the suspect JavaScript code in a dedicated scope of the detection JavaScript code.

In some embodiments, the monitoring further comprises, in the dedicated scope: overriding, with a proxy object, a name of an object whose property references a JavaScript host environment object, wherein JavaScript host environment object has the non-writable, non-configurable JavaScript property; and monitoring access to a property of the proxy object, thereby indirectly monitoring access to the non-writable, non-configurable JavaScript property of the JavaScript host environment object.

In some embodiments, the overriding further comprises: creating the proxy object using a function that receives a reference to the name, wherein the reference: is named differently than the name, and is defined in an outer scope that encompasses the dedicated scope.

In some embodiments, the proxy object is configured to throw an error in response to the non-writable, non-configurable JavaScript property of the proxy object being accessed by the suspect JavaScript code; the monitoring further comprises executing the suspect JavaScript code using a 'try' statement; and the detection of the security threat is when the error is caught using a 'catch' statement associated with the 'try' statement.

In some embodiments, the proxy object is configured to fire an event in response to the non-writable, non-configurable JavaScript property of the proxy object being accessed by the suspect JavaScript code; and the detection of the security threat is when the event is captured using an event listener.

In some embodiments, the proxy object is configured, in response to the non-writable, non-configurable JavaScript property of the proxy object being accessed, to prevent the web browser from executing the suspect JavaScript code beyond the wrapped suspect JavaScript code.

In some embodiments, the JavaScript host environment object is 'location'; and the attempt is to set the property of 'location' to a Uniform Resource Locator (URL) associated with a security attack, in order to effect navigation in the web browser without user consent.

In some embodiments, the wrapping and the executing are performed by at least one hardware processor of the computer implementing the computer-implemented method.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
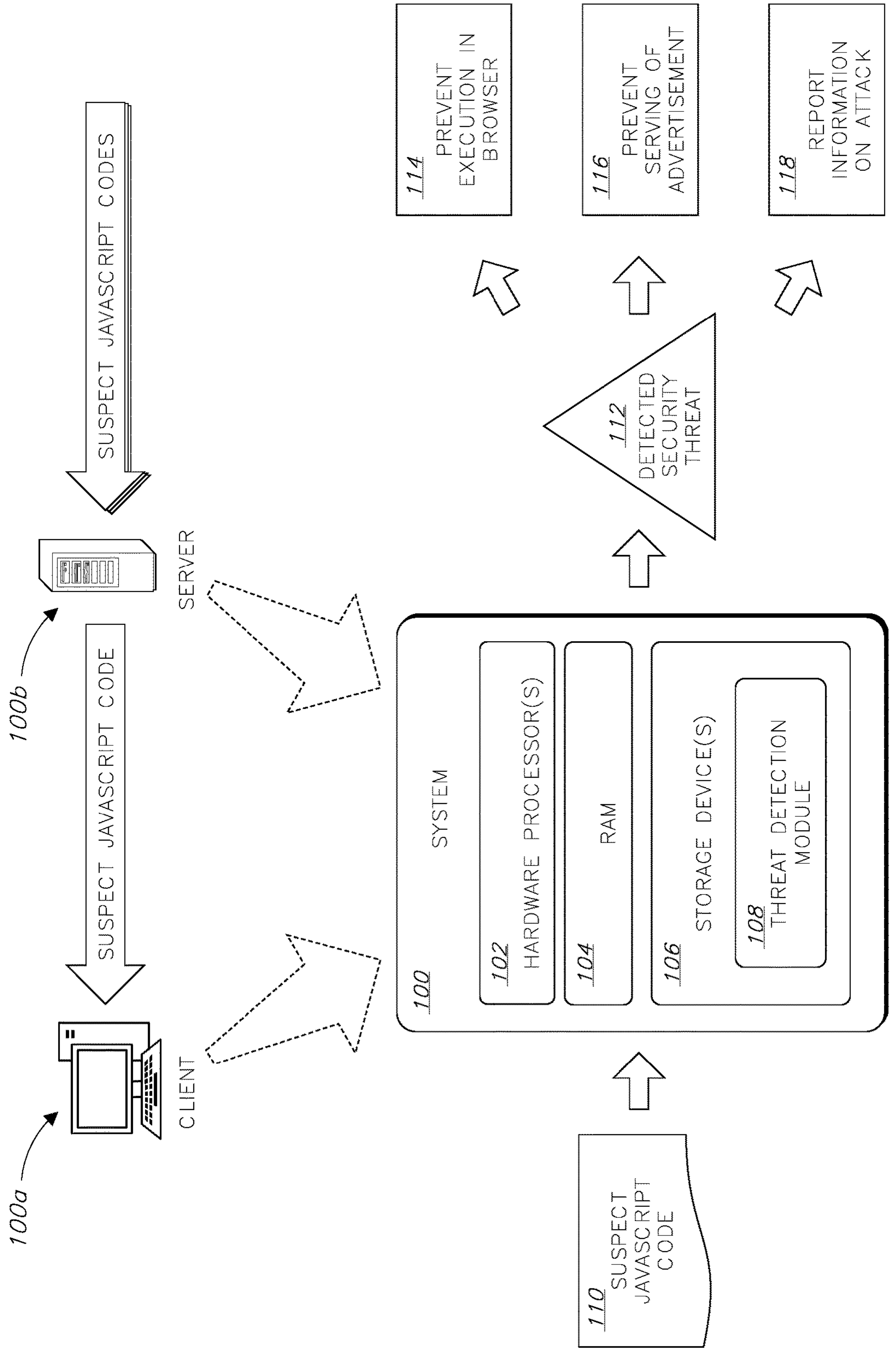
FIG. 1 is a block diagram of an exemplary system for detecting, and optionally neutralizing, security attacks on web browsers, according to embodiments.

Disclosed herein is technique, embodied as a method, a system, and a computer program product, for detecting security threats to web browsers. The technique may detect attempts to effect navigation in the web browser without user consent, such as to cause the web browser to access a URL (Uniform Resource Locator) defined by an attacker.

More generally, the technique may offer a framework for detection of attempts to perform a variety of malicious actions in the web browser without user consent. This framework may be utilized, per user preference, for real-time web browser protection, or for systematic scanning of suspect JavaScript program codes before they are served to end-user web browsers by some server, such as an online advertising server.

Advantageously, the technique may detect such security threats by monitoring a type of properties which are not trivial to monitor—non-writable, non-configurable JavaScript properties (namely, of JavaScript objects). Some types of attacks use such properties to effect various actions in the web browser without user consent. One example is the use of non-writable, non-configurable properties of host environment objects of the web browser (hereinafter "host objects") to influence behavior of the web browser. Per the ECMAScript standard (Standard ECMA-262, 11th edition, June 2020, "ECMAScript® 2020 Language Specification," also known as the "JavaScript standard"), "a web browser provides an ECMAScript host environment for client-side computation including, for instance, objects that represent windows, menus, pop-ups, dialog boxes, text areas, anchors, frames, history, cookies, and input/output." For simplicity of presentation, the following description typically refers to the monitoring of host objects; however, it is explicitly intended that any non-writable, non-configurable JavaScript property may be monitored in accordance with the same principles.

Attacks that cause a web browser to access a certain URL, for example, sometimes involve JavaScript program code that accesses a property of a host object, such as a 'href' property of a 'location' host object, and sets its value to the certain URL. However, web browsers typically regard such host objects as protected, making it hard to devise counter-programming that will monitor property activity in these objects and will detect sudden attempts to set them.

With respect to the 'location' host object, for example, the Living HTML Standard of The Web Hypertext Application Technology Working Group (WHATWG) (online, at html.spec.whatwg.org, last viewed Dec. 1, 2020) defines it in sections 3.1.1 and 7.3 thereof as "[PutForwards=href, LegacyUnforgeable] readonly attribute Location location". Its "LegacyUnforgeable" extended attribute "indicates that the attribute or operation will be reflected as an ECMAScript property in a way that means its behavior cannot be modified and that performing a property lookup on the object will always result in the attribute's property value being returned. In particular, the property will be non-configurable and will exist as an own property on the object itself rather than on its prototype." See Web Platform Working Group (WebApps WG), "Web IDL," Editor's Draft, Nov. 5, 2020, online at heycam.github.io/webidl (last viewed Dec. 1, 2020), section 3.4.10.

Put differently, the operation of the 'location' host object (and similar host objects, and generally all non-writable, non-configurable object properties) is inherently protected, and cannot be directly altered, overridden, proxied, or the like, by a monitoring and/or detection program (typically a JavaScript program) that aims to observe whether a URL value is suddenly being set in a property of that object (e.g., the 'href' property of 'location'); any JavaScript engine (implemented in a web browser) or web browser engine adhering to the protection of host objects (such as 'location'), which today likely means all or most publicly-available web browsers, will enforce that protection and prevent direct monitoring of such host objects.

To nonetheless monitor the operation of these host objects and detect whether they are being accessed by some suspect JavaScript program code, the present technique may wrap such suspect code and let it controllably execute in a dedicated scope that makes the relevant property of the host object indirectly monitorable, by altering a scope of the suspect code. This circumvents JavaScript's inherent prevention of direct monitoring of host object properties, and allows for specialized JavaScript program code (hereinafter simply "detection code") of the present technique to detect whether the suspect code attempts to effect navigation in the web browser. In addition, the wrapping of the suspect code may be performed in a way that gains control over that code's actions and can prevent it, in a real-time web browser protection scenario, from maliciously effecting navigation in the web browser.

The following discussions illustrate the present technique with reference to a 'location' host object. However, as those of skill in the art will recognize, the technique may be similarly applicable to other types of objects (host objects, built-in objects, etc.) defined in the Living HTML Standard, in the JavaScript standard, and/or in any other widely-accepted HTML/JavaScript specification or standard now in existence or later introduced.

Properties of a 'location' host object may be particularly challenging to monitor, not only due to their aforementioned protected status, but also because 'location' is only accessible through various different properties of other host objects that reference it. These include, for example, the 'window' and 'document' host objects, that provide access to the 'location' host object via 'window.location' and 'document.location', respectively. Moreover, each of 'window' and 'document' may have sub-properties that provide access to objects such as 'self', 'top', 'parent', 'self', and 'frames', each of which, in turn, provides access to 'location' by a sub-property. For example, 'location' may be accessible through 'window.top.location' or 'document.top.location'. JavaScript also allows shorthand writing that omits 'window' and 'document'; for instance, 'top.location' may be a shorthand for 'window.top.location'.

Another complexity may arise from the fact that, depending on the pertinent window or document hierarchy of a certain web page rendered in a web browser, there could be several different 'location' objects. For instance, if the web page includes a main document and a frame nested within it, each will have its own 'location' host object, which may be accessed differently depending on the context from which it is accessed: the 'location' of the main document may be accessed, as one example, through 'window.location' if called from the main document itself, or through 'parent.location' if called from the nested frame.

Lastly, the 'defaultView' and 'globalThis' host objects may also provide access to a 'location' host object as a property, and each of the two may be accessible, in turn, through a property of 'document' (e.g., 'document.defaultView') or directly (e.g., 'defaultView').

In sum, JavaScript provides many host objects, some overlapping, with properties that allow access to one or more 'location' host objects. It follows that an attacker may choose any of these properties as its vector for maliciously setting a 'location' host object to a certain target URL, for a certain context (e.g., a main document of a web page, a frame, etc.). In order to detect attacks across all such possible attack vectors, therefore, it may be necessary to monitor the respective property of each and every one of the other host objects that reference a 'location' host object, or at least some of these properties.

Reference is now made to FIG. 1, which shows a block diagram of an exemplary system 100 for detecting, and optionally neutralizing, security attacks on web browsers, according to an embodiment. In different embodiments, system 100 may be a client computing device 100*a* belonging to an end-user who may be the target of a security attack, or a server computing device 100*b* belonging to an entity which scans an attack vector, such as online advertisements, before they are being served to end-users.

System 100 may include one or more hardware processors 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as an attack detection module 108. The software components may include an operating system having various software components and/or drivers for controlling and managing general system tasks (e.g., memory management, storage device control, power management, etc.), and facilitating communication between various hardware and software components.

System 100 may operate by loading instructions of attack detection module 108 into RAM 104 as they are being executed by processor(s) 102. The instructions of attack detection module 108 may cause system 100 to receive a suspect code 110, process it, detect a security threat 112 existing in it, and optionally perform one or more subsequent actions responsive to such detection, such as: in block 114, prevent a web browser from executing the suspect code; in block 116, prevent an advertising server from serving an advertisement which includes or is otherwise associated with the suspect code; in block 118, transmit and report information associated with the detected security threat to a remote server; and/or the like.

When system 100 is a client computing device 100*a*, for instance, attack detection module 108 may execute in a web browser running on the system, be it a regular, commercial web browser such as Chrome™, Firefox™, Safari®, or Edge™, or a web browser engine (commonly referred to as a "web view" or a similar appellation) embedded in a software application running on the system (e.g., a computer game, or any other application type) and fetching external content, such as advertisements, displayed next to the regular content of the application.

When system 100 is a server computing device 100*b*, in contrast, attack detection module 108 may execute on a headless web browser running on the system, namely—a web browser lacking a Graphical User Interface (GUI) and operated through a command-line interface, an Application Program Interface (API), or the like. Instructions of attack detection module 108 may be provided to such headless web browser in an automatic and programmatic manner alongside multiple suspect codes, to efficiently scan them. It is also possible, of course, to execute attack detection module 108 on a regular web browser equipped with a GUI and running on the server computing device.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art.

Figure 2:
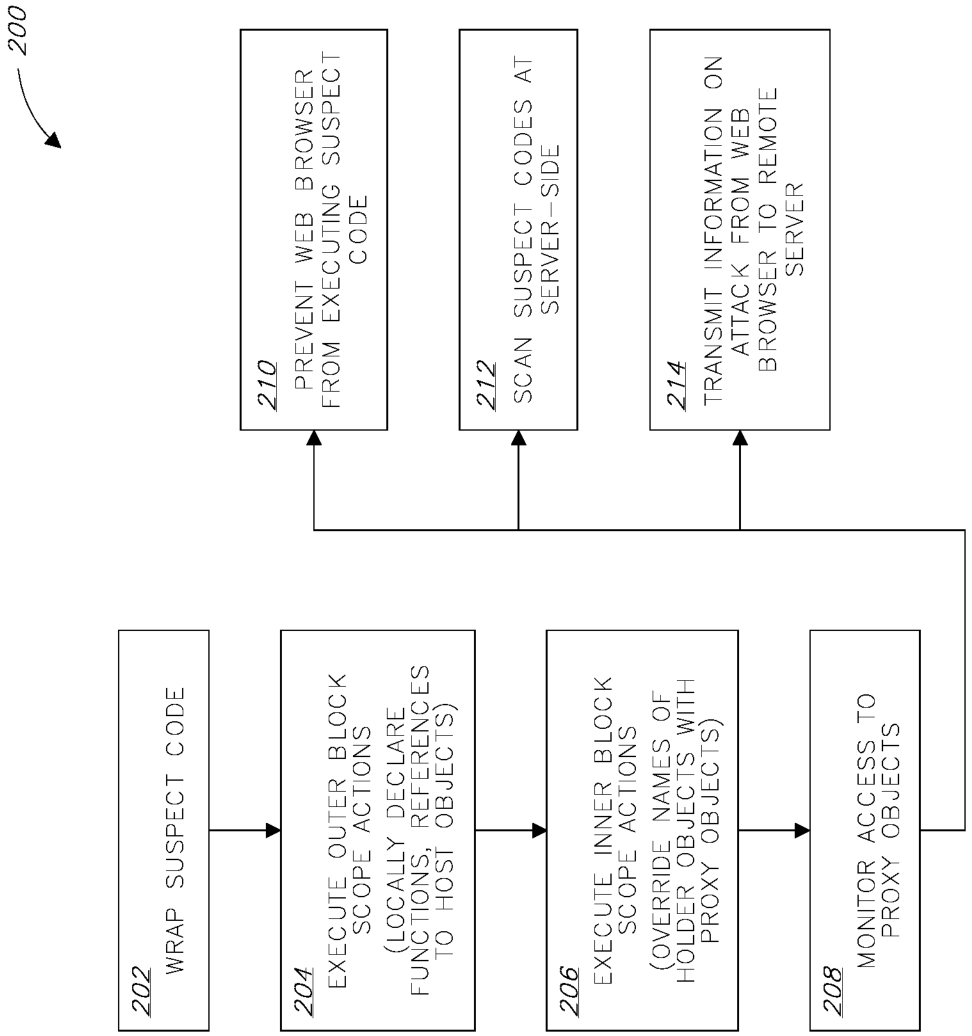
FIG. 2 is a flowchart of a method for detecting, and optionally neutralizing, security attacks on web browsers, according to embodiments.

The instructions of attack detection module 108 are now discussed with reference to the flowchart of FIG. 2, which illustrates a method 200 for detecting security attacks, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

Method 200, in general terms, may detect a security threat by automatically monitoring, using a detection code executed by a web browser, access to a property of a host object of the web browser. The security threat may be an attempt to set a property of the host object, to thereby effect navigation in the web browser.

Algorithm 1 below is an exemplary snippet of some aspects of such detection code, which is configured to carry out actions according to the present technique. The exemplary code in Algorithm 1 illustrates principles of present embodiments, but those of skill in the art will readily recognize how the exemplary code can be adapted for specific scenarios and needs, and how to adjust the code or add to it in order for it to properly run; the exemplary code, or parts thereof, may therefore also be regarded as pseudocode. As one example, client-level and server-level implementations may call for different types of adaptations that will become apparent to those of skill in the art. Those skilled artisans will also recognize that variable and function names in Algorithm 1 (e.g., 'wrapCode', 'windowRef') are arbitrary and can be named per user preference, except, of course, for names of preexisting host objects and properties (e.g., 'window') that are not declared by Algorithm 1 but are just referenced in them.

Algorithm 1

```
1:  let wrapCode = (suspectCode) => {
2:    let wrappedCode =
3:      '{  // Outer block scope
4:          let createHolderProxy = ${createHolderProxy };
5:          let createProxy = ${createProxy };
6:          let isHolder = ${isHolder};
7:          let windowRef = window;
8:          let documentRef = document;
9:          let selfRef = self;
10:         let topRef = top;
11:         let parentRef = parent;
12:         let framesRef = frames;
13:         let defaultViewRef = defaultView;
14:         let globalThisRef = globalThis;
15:         { // Inner block scope
16:           let window = createHolderProxy(windowRef);
17:           let document = createHolderProxy(documentRef);
18:           let self = createHolderProxy(selfRef);
19:           let top = createHolderProxy(topRef);
20:           let parent = createHolderProxy(parentRef);
21:           let frames = createHolderProxy(framesRef);
22:           let defaultView = createHolderProxy(defaultViewRef);
23:           let globalThis = createHolderProxy(globalThisRef);
24:           try {
25:               ${suspectCode }
26:           }
27:           catch (e) {
28:             if (e.message === 'navigation') {
29:                 console.log('attempted navigation to' +
30:                 windowProxy.location + 'detected');
31:             }
32:             else {
33:                 console.log('other exception:', e);
34:             }
35:           }
36:         }
37:     }';
38: return wrappedCode;
39: }
```

In step 202, a suspect code may be wrapped by a detection code that embodies aspects of the present technique. Algorithm 1 demonstrates an arrow function ('wrapCode') that receives as input the suspect code ('suspectCode'), performs various actions spanning lines 3-34, and returns a wrapped suspect code ('wrappedCode') which may then be executed (to effect these actions) in a manner fitting the pertinent scenario.

For example, a client-level implementation may include additional code that executes the wrapped suspect code during or immediately after a web page is loaded by the web browser, whereas a server-level implementation may include additional code that systematically executes multiple such wrapped suspect codes, typically originating from different attack vectors (e.g., different online advertisements), one after the other or in parallel (if the server supports parallelism).

Those of skill in the art will recognize that the wrapping of the suspect code with the detection code is just one possible implementation of the present technique, and that other, suitable detection code, which is based upon principles of the detection code described herein, may be used to monitor execution of the suspect code without such wrapping.

The variable 'suspectCode' may be a string-type variable assigned with the suspect code, either alone or as part of HTML code that encompasses it, externally links to it, or the like, such an online advertisement containing the suspect code or links to it. In case the suspect code is linked to by the encompassing HTML code, its assignment to the 'suspectCode' variable may also include actively fetching the suspect code from a remote server, over a network, via a URL defined in the HTML.

In step 204, actions of an outer block scope may execute, such as lines 4-13 of the exemplary code, which are situated between the curly brackets of lines 3 and 33 that circumscribe the outer block scope. These actions of the outer block scope may be in preparation for and support of actions of an inner block scope, also referred to as a "dedicated" block scope, situated between the curly brackets of lines 14 and 33 and encompassed by the outer block scope.

It should be noted that the inner and outer block scopes are given merely as examples of JavaScript execution scopes. Those of skill in the art will recognize other possibilities for effecting such execution scopes without block-type scopes, such as using one or more JavaScript 'with' statements.

Lines 4-6 declare (also "define") locally, in the outer block scope, names of externally-defined functions that are tasked with proxy object creation and/or actions associated therewith. These functions, 'createHolderProxy', 'createProxy', and 'isHolder', are further discussed below. In some embodiments, however, only one or two of these functions may be utilized, such as if the host object to be monitored is not one which is referenced by a property of another host object, or if it is desired to monitor a host object only through a single host object whose property references the monitored host object.

As an alternative to using externally-defined functions, such functions may be explicitly written within the outer block scope—depending on user preference.

Lines 5-11 locally define references to those host objects whose properties provide access to the host object to be monitored (e.g. the 'location' host object), such as the 'window', 'document', 'self', 'top', 'parent' 'frames', 'defaultView', and 'globalThis' host objects. This may be done by assigning the names of these host objects to variables that are named differently, such as 'windowRef', 'documentRef', 'selfRef', 'topRef', 'parentRef' 'framesRef', 'defaultViewRef', and 'globalThisRef', respectively. In various embodiments of the present technique, reference(s) to any one or more of these host objects, and not necessarily to all (as in Algorithm 1), may be defined.

To clearly differentiate the host object to be monitored from the host objects whose properties provide access to the former host object, the latter are termed hereinafter "holder objects," as they essentially hold references to the host object to be monitored.

Also, readers should take care not to confuse the term "reference" when used to denote the variable referencing such holder object, with the term "reference" when used to denote the property of such holder object which references (provides access to) the host object to be monitored.

The naming of each of these variables differently than how each corresponding host object is named may support the later creation of the proxy object (discussed below), and may circumvent an inherent inability of JavaScript to override the name of these holder objects with a function that receives the name itself as input. For example, trying to create a proxy object without such circumvention, by tautologically stating 'let window=createProxy(window)', will not be understood by the JavaScript engine.

In step 206, in the dedicated (inner) block scope (lines 14-33 of Algorithm 1), the name of each of the holder objects may be overridden with a proxy object, such that operations of any host object to be monitored (e.g., 'location'), which is referenced by a property of such holder object, are intercepted by the proxy object.

By performing this in the dedicated block scope, the scope of the suspect code is essentially overridden, so that any attempt to access the 'location' host object proxy by that suspect code becomes monitorable. The overriding of the names of the holder objects may advantageously be done by a JavaScript 'let' statement, that limits the overriding to the dedicated block scope, and thus helps circumventing the protection given to the host object to be monitored by the JavaScript engine. A 'let' statement in JavaScript allows declaring variables (including instantiating objects) that will be limited to the scope of a block statement, or to an expression on which 'let' is used; this stands in contrast to the JavaScript 'var' statement, which declares a variable globally (or locally to an entire function) regardless of block scope. Another possibility, although now nearly deprecated in JavaScript, is to use a 'with' statement, as briefly discussed above, to effect overriding of the names of the holder objects in a certain scope as defined by the 'with' statement.

As exemplified in lines 15-21, names of holder objects are overridden with 'let' statements such as 'let window=create Proxy(windowRef)', overriding the 'window' with a proxy object which receives the differently-named reference to 'window' ('windowRef) as input, and similarly for the other holder object names.

In step 208, access to the one or more proxy objects may be monitored, to detect any activity of a type which was predetermined to mean a security threat. Namely, by virtue of steps 202-206, the present technique may be able to freely monitor access to a desired property of the proxy object, without any prohibition posed by JavaScript itself (namely, the pertinent JavaScript engine), thereby indirectly monitoring access to the corresponding property of the 'location' host object.

Step 208 allows for the proxied monitoring of various different host objects, with 'location' given as a prominent example because it typically gets affected when an attack induces navigation in the web browser. In a web browser under attack, navigation is typically effected by setting the value of the 'href' property of the 'location' host object to a URL defined by the attacker. This will redirect an affected window or frame of the web browser to the URL, without intention or consent of the web browser's human user.

If, for example, the suspect code sets the 'window.location' property (or more specifically, its 'href' sub-property) to a certain URL, a corresponding 'location' property of the 'windowProxy' proxy object (windowProxy.location') will also be set that URL, and the present technique, which monitors such proxy activity, will be able to detect that occurrence.

Each proxy object may be configured, by suitable JavaScript programming (further discussed below), to issue an indication in response to its property of interest being accessed. Such indication may be effected, for example, by throwing an error, firing an event, calling a function configured to carry out certain action, and/or by any other suitable means. In the event-firing example, an event listener may be used to capture the fired event. In the error-throwing example, the suspect code may be executed in the dedicated block scope using a 'try' statement (lines 22-24), and the detection of a security threat will be by catching a thrown error using a subsequent 'catch' statement (lines 25-32).

The proxy object may be configured to construct the content of the indication (such as the error, the event, etc.) so it conveys meaningful information about the attempted attack, as well as to differentiate it from other possible indications (e.g., errors, events, etc.) which the pertinent JavaScript engine may indicate but which are unrelated to the security threat sought after by the present technique. For example, the error, if one is used, may be structured to contain a descriptor of the type of security threat detected (e.g., 'navigation', as in line 26, to denote an attempt to navigate a window or frame of the web browser without user consent), with or without one or more of the following: First, the URL to which navigation was attempted, and second, a select segment of the suspect code, up to the entirety of the suspect code.

As an alternative to including such information in the content of the error itself, the proxy object may be configured to just include a brief descriptor of the security threat type (e.g., 'navigation'), and the 'catch' statement of the detection code may the one that logs more comprehensive information about the security threat. A simplistic example is shown in lines 27-28 of Algorithm 1, where the thrown error's content is just 'navigation', but the 'catch' statement logs a lengthier string of text: "attempted navigation to'+ windowProxy.location+'detected", in which URL will replace 'windowProxy.location'. Similarly, the 'catch' statement may be configured to log any other information associated with the security threat and/or the suspect code, so that the logged information may be utilized for carrying out one or more additional actions. The same rationale applies to the usage of events and/or functions to issue an indication of the attack.

One or more such actions may be carried out responsive to a security threat being detected during the monitoring of step 208, namely—when an indication indicative of such security threat is issued. For example:

In step 210, the web browser may be prevented from executing the suspect code (of course, beyond its controlled execution by the present technique), thereby neutralizing the security threat. This may be performed by suitable JavaScript code of the present technique, which, for example, rewrites relevant HTML code of the document which includes the suspect code or includes a call to where the suspect code is remotely hosted, so that the web browser will not execute the suspect code. This is just one of many possibilities to prevent execution of the suspect code, which will become apparent to those of skill in the art. Step 210 may be particularly useful in a client-level implementation of the present technique, in which real-time protection of the web browser is provided.

In step 212, which may be particularly useful in a server-level implementation of the present technique, detection of security threats may be made before the suspect code even reaches a user's web browser, by performing the monitoring at web browser (such as a headless web browser) run on the server. For example, for security attacks that use online advertisements as their general attack vectors, scanning may be performed at a server of an advertising network, advertising exchange, or any other entity that receives and aggregates advertisements from various advertisers and disseminates them to web browsers which visit certain web sites subscribed to that entity's service.

To scan, that entity may systematically execute the present technique on suspect codes found in advertisements it receives for dissemination, or even on the entire code of these advertisements (typically including HTML in conjunction with embedded or externally-linked JavaScript code). An advertisement in which a security threat is detected may be blocked from dissemination to web sites, thereby neutralizing the attack. Even if a certain advertisement is determined to be clean of security threats following a scan, it may still be periodically re-scanned in order to detect whether its externally-linked JavaScript code has been altered to execute a security attack. For instance, re-scanning of a "clean" advertisement may be performed once every N times the advertisement has been served to web browsers of end users, where N may be an integer between 100-100,000, or beyond that range.

In step 214, the indication (e.g., error) content may be transmitted from the web browser, over a network, to a remote server, to report information about the attack for purposes such as logging, analysis, and/or the like. Transmittal may be made, additionally or alternatively, internally in the computer executing method 200 or internally in a computer network of an entity executing method 200, to a software program or module which performs such logging and/or analysis.

In one specific implementation of method 200, both of steps 210 and 212 are carried out (with or without step 214), to both periodically scan advertisement at the advertising network/exchange server level, and to scan advertisements at the client level after their code has been downloaded to a user's web browser. The latter may be achieved by having the advertising network/exchange serve advertisements along with JavaScript code (or a link to such code, hosted on a server and fetched by the user's web browser) that executes the method in the user's web browser, or by having web site owners or administrators implant that JavaScript code (or a link thereto) in their web site's source code. This way, some security attacks may be detected and neutralized already at the server level, and those attacks resulting from a later alteration of the advertisement's externally-linked JavaScript code may be detected and neutralized at the client level.

Based on the same principles, security attacks may be detected (and optionally neutralized) even if they use an attack vector unrelated to advertising but which still reaches user web browsers. For example, malicious JavaScript codes may find their way into web sites through various Content Management System (CMS) add-ons innocently installed by web site owners, or by attackers hacking into web hosting systems and implanting their malicious codes. As another example, some attacks may be manifested by seemingly-innocent web browser add-ons (or "extensions") installed by end-users, which add-ons later stealthily inject malicious JavaScript into an execution chain of the web browser's JavaScript engine.

The functions tasked with proxy object creation and/or associated actions, namely—'createHolderProxy', 'createProxy', and 'isHolder', are now discussed in greater detail. Although these are exemplified here as separate functions, they may be just as well be implemented as one or a greater number of functions, or even as series of actions not arranged in function form. They can therefore be regarded as "functionalities" of the detection code, not necessarily "functions" in the strict programming meaning of the word.

This triplet of functions may be especially suited for scenarios requiring to proxy multiple holder objects whose properties reference a certain host object to be monitored, such as 'location' (or multiple groups of holder objects, where holder objects of each group reference a certain different host object). In such scenarios, JavaScript itself may thwart direct proxying of the host object to be monitored (e.g., 'location'), and any such attempt will result in a proxy object that will fail to intercept operations of the host object. Specifically as to 'location', the fact that this host object is defined in JavaScript to be non-writable and non-configurable simply prevents its reassignment as well as its reconfiguration (as writable, for example).

Figure 3:
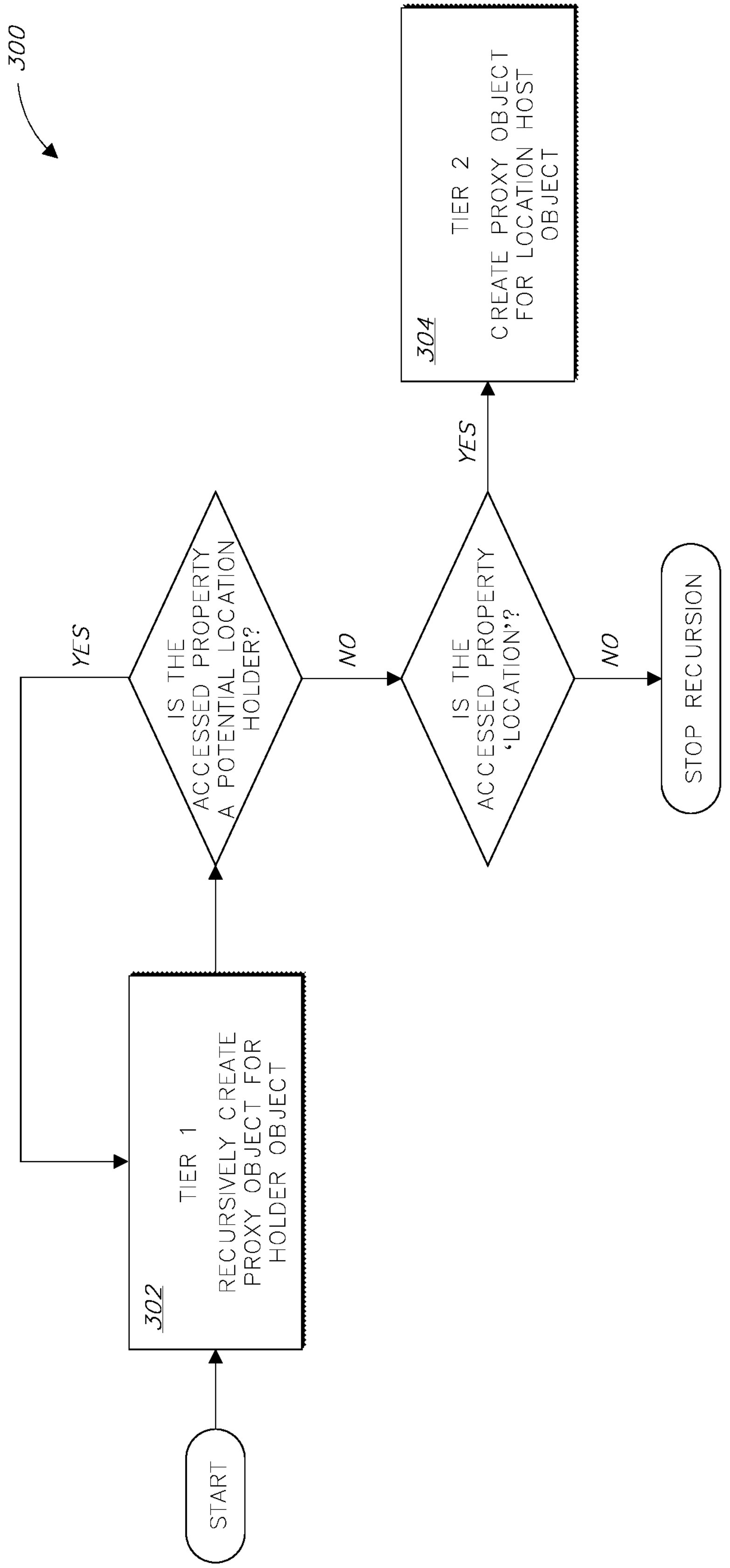
FIG. 3 is a flowchart of a two-tiered proxying configuration, according to embodiments.

Accordingly, in such scenarios, a two-tiered proxying configuration 300 may be used, as illustrated in the flowchart of FIG. 3: In a first tier 302, the 'createHolderProxy' function may create a proxy object for each of the holder objects, and define a customized setter and getter for the proxy object. These customized setter and getter may be configured to check if a property accessed by the suspect code is 'location'; by way of example, for a proxy object named 'windowProxy', which is a proxy to the 'window' holder object, these customized setter and getter may check if 'windowProxy.location' is the property being accessed by the suspect code. If it is, then the 'createHolderProxy' function may call a second tier 304 function, the 'createProxy' function. In the second tier 304, a proxy object may be created for the 'location' host object itself, which was referenced by its holder's 'location' property.

If, however, the property accessed by the suspect code is not 'location' but rather yet another host object which is a potential holder of 'location' (e.g., 'window.top'), then the 'createHolderProxy' function of the first tier 302 may repeat its proxy object creation process for that other host object. Namely, the 'createHolderProxy' function may be configured to recursively check the accessed property of a host object and create a respective proxy object, in order to handle any number of nesting levels of properties until a 'location' property is found. For example, reaching 'window.parent.document.location' may require three recursive runs before proceeding to the second-tier creation of a proxy object for 'location', whereas reaching 'window.location' may only require a single run.

To prevent the 'createHolderProxy' function from running unneededly when the accessed property is not a host object of interest (namely, one which cannot be a holder of 'location'), it may utilize another function, 'isHolder', to check the name of the pertinent property against a list of potential host objects. The list may include, for example, 'window', 'document', 'self', 'top', 'parent', 'frames', 'defaultView', and/or 'globalThis'. In case the property accessed by the suspect code is not on that list, the recursion may cease. For instance, if that property is 'name' (e.g., 'window.name'), then there is no reason to continue recursion because 'name' cannot have 'location' as its sub-property, and even if 'name' were to be proxied—it would not have yielded a 'location' proxy object.

In the 'createProxy' function of the second tier 304, a customized setter of the 'location' proxy object may be configured to throw an error when it is accessed by the suspect code (or to issue any other type of indication, as discussed above). That error will be caught by the 'catch' action of lines 26-29 of Algorithm 1, when the wrapped suspect code is executed. The 'createProxy' function may be configured to define the content of the thrown error according to one of the options discussed above, such as to include a descriptor of the attack type (e.g., 'navigation'), the URL to which 'location' (or its 'href' property) is being set, up to the entirety of the suspect code. The 'catch' action will then receive this content in a 'message' property, for example, of an error object.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:

automatically monitoring access to a property of a non-writable, non-configurable JavaScript property in a JavaScript code, wherein the automatic monitoring comprises changing an execution scope of the JavaScript code.

2. The computer-implemented method of claim 1, wherein the automatic monitoring is performed in a web browser.

3. The computer-implemented method of claim 2, further comprising:

in response to a security threat being detected by the automatic monitoring, preventing the web browser from executing the JavaScript code beyond the changed execution scope.

4. The computer-implemented method of claim 1, wherein the non-writable, non-configurable JavaScript property is of a JavaScript host environment object.

5. The computer-implemented method of claim 1, wherein:

the automatic monitoring comprises executing the JavaScript code within a detection JavaScript code that wraps the JavaScript code; and the detection JavaScript code comprises instructions that effect the automatic monitoring when the wrapped JavaScript code is executed.

6. The computer-implemented method of claim 5, wherein the changing of the execution scope comprises executing the JavaScript code in a dedicated scope of the detection JavaScript code.

7. The computer-implemented method of claim 1, wherein the automatic monitoring further comprises, in the changed execution scope:

overriding, with a proxy object, a name of an object whose property references a JavaScript host environment object, wherein JavaScript host environment object has the non-writable, non-configurable JavaScript property; and monitoring access to a property of the proxy object, thereby monitoring access to the non-writable, non-configurable JavaScript property of the JavaScript host environment object.

8. The computer-implemented method of claim 7, wherein the overriding further comprises creating the proxy object using a function that receives a reference to the name, wherein the reference: is named differently than the name, and is defined in an outer scope that encompasses the dedicated scope.

9. The computer-implemented method of claim 7, wherein:

the proxy object is configured to throw an error in response to the non-writable, non-configurable JavaScript property of the proxy object being accessed by the JavaScript code;

the automatic monitoring further comprises executing the JavaScript code using a 'try' statement; and the automatic monitoring further comprises detecting a security threat when the error is caught using a 'catch' statement associated with the 'try' statement.

10. The computer-implemented method of claim 7, wherein:

the proxy object is configured to fire an event in response to the non-writable, non-configurable JavaScript property of the proxy object being accessed by the JavaScript code; and the automatic monitoring further comprises detecting a security threat when the event is captured using an event listener.

11. The computer-implemented method of claim 7, wherein:

the proxy object is configured, in response to the non-writable, non-configurable JavaScript property of the proxy object being accessed, to prevent a web browser from executing the JavaScript code beyond the wrapped suspect JavaScript code.

12. A system comprising:

at least one hardware processor; and a non-transitory computer-readable storage medium having program code embodied therewith, the program code executable by said at least one hardware processor to:

automatically monitor access to a property of a non-writable, non-configurable JavaScript property in a JavaScript code, wherein the automatic monitoring comprises changing an execution scope of the JavaScript code.

13. The system of claim 12, wherein the automatic monitoring is performed in a web browser.

14. The system of claim 13, wherein the program code is further executable by said at least one hardware processor to:

in response to a security threat being detected by the automatic monitoring, prevent the web browser from executing the JavaScript code beyond the changed execution scope.

15. The system of claim 12, wherein the non-writable, non-configurable JavaScript property is of a JavaScript host environment object.

16. The system of claim 11, wherein:

the automatic monitoring comprises executing the JavaScript code within a detection JavaScript code that wraps the JavaScript code; and the detection JavaScript code comprises instructions that effect the automatic monitoring when the wrapped JavaScript code is executed.

17. The system of claim 16, wherein the changing of the execution scope comprises executing the JavaScript code in a dedicated scope of the detection JavaScript code.

18. The system of claim 12, wherein the automatic monitoring further comprises, in the changed execution scope:

overriding, with a proxy object, a name of an object whose property references a JavaScript host environment object, wherein JavaScript host environment object has the non-writable, non-configurable JavaScript property; and monitoring access to a property of the proxy object, thereby monitoring access to the non-writable, non-configurable JavaScript property of the JavaScript host environment object.

19. The system of claim 18, wherein the overriding further comprises creating the proxy object using a function that receives a reference to the name, wherein the reference: is named differently than the name, and is defined in an outer scope that encompasses the dedicated scope.

20. The system of claim 18, wherein:

the proxy object is configured to throw an error in response to the non-writable, non-configurable JavaScript property of the proxy object being accessed by the JavaScript code;

the automatic monitoring further comprises executing the JavaScript code using a 'try' statement; and the automatic monitoring further comprises detecting a security threat when the error is caught using a 'catch' statement associated with the 'try' statement.

21. The system of claim 18, wherein:

the proxy object is configured to fire an event in response to the non-writable, non-configurable JavaScript property of the proxy object being accessed by the JavaScript code; and the automatic monitoring further comprises detecting a security threat when the event is captured using an event listener.

22. The system of claim 18, wherein:

the proxy object is configured, in response to the non-writable, non-configurable JavaScript property of the proxy object being accessed, to prevent a web browser from executing the JavaScript code beyond the wrapped suspect JavaScript code.

23. A computer program product comprising a non-transitory computer-readable storage medium having program code embodied therewith, the program code executable by at least one hardware processor to:

automatically monitor access to a property of a non-writable, non-configurable JavaScript property in a JavaScript code, wherein the automatic monitoring comprises changing an execution scope of the JavaScript code.

24. The computer program product of claim 23, wherein the automatic monitoring is performed in a web browser.

25. The computer program product of claim 24, wherein the program code is further executable by said at least one hardware processor to:

in response to a security threat being detected by the automatic monitoring, prevent the web browser from executing the JavaScript code beyond the changed execution scope.

26. The computer program product of claim 23, wherein the non-writable, non-configurable JavaScript property is of a JavaScript host environment object.

27. The computer program product of claim 22, wherein:

the automatic monitoring comprises executing the JavaScript code within a detection JavaScript code that wraps the JavaScript code; and the detection JavaScript code comprises instructions that effect the automatic monitoring when the wrapped JavaScript code is executed.

28. The computer program product of claim 27, wherein the changing of the execution scope comprises executing the JavaScript code in a dedicated scope of the detection JavaScript code.

29. The computer program product of claim 23, wherein the automatic monitoring further comprises, in the changed execution scope:

overriding, with a proxy object, a name of an object whose property references a JavaScript host environment object, wherein JavaScript host environment object has the non-writable, non-configurable JavaScript property; and monitoring access to a property of the proxy object, thereby monitoring access to the non-writable, non-configurable JavaScript property of the JavaScript host environment object.

30. The computer program product of claim 29, wherein the overriding further comprises creating the proxy object using a function that receives a reference to the name, wherein the reference: is named differently than the name, and is defined in an outer scope that encompasses the dedicated scope.

31. The computer program product of claim 29, wherein:

the proxy object is configured to throw an error in response to the non-writable, non-configurable JavaScript property of the proxy object being accessed by the JavaScript code;

the automatic monitoring further comprises executing the JavaScript code using a 'try' statement; and the automatic monitoring further comprises detecting a security threat when the error is caught using a 'catch' statement associated with the 'try' statement.

32. The computer program product of claim 29, wherein:

the proxy object is configured to fire an event in response to the non-writable, non-configurable JavaScript property of the proxy object being accessed by the JavaScript code; and the automatic monitoring further comprises detecting a security threat when the event is captured using an event listener.

33. The computer program product of claim 29, wherein:

the proxy object is configured, in response to the non-writable, non-configurable JavaScript property of the proxy object being accessed, to prevent a web browser from executing the JavaScript code beyond the wrapped suspect JavaScript code.

* * * * *